United States Patent Office 3,012,751
Patented Dec. 12, 1961

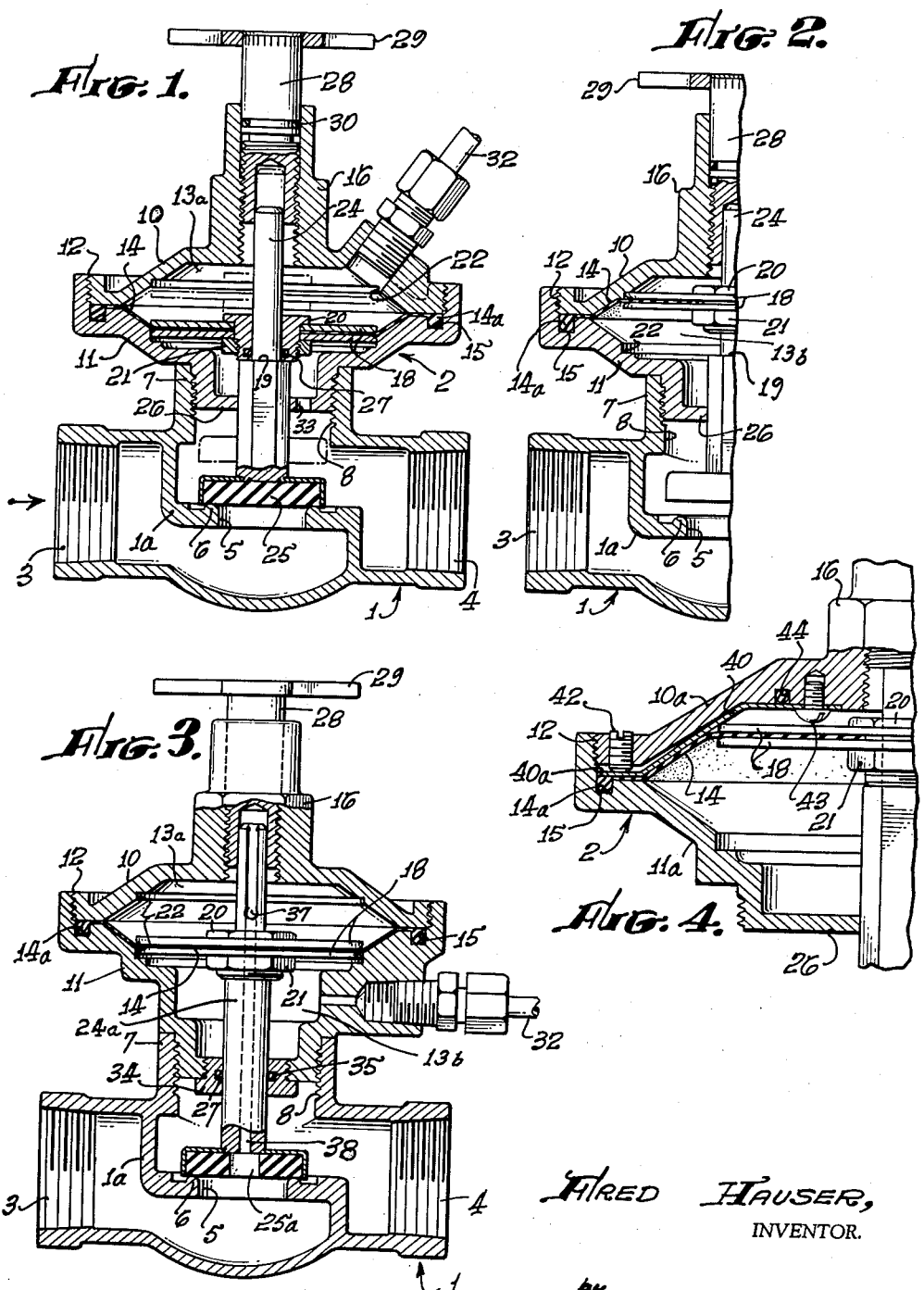
Dec. 12, 1961 — F. HAUSER — 3,012,751
DIAPHRAGM ACTUATED VALVE
Filed Feb. 2, 1959
FRED HAUSER,
INVENTOR.
by Knight & Rodgers
ATTORNEYS.

3,012,751
DIAPHRAGM ACTUATED VALVE
Fred Hauser, 1544 Midvale Ave., Los Angeles 24, Calif.
Filed Feb. 2, 1959, Ser. No. 790,531
6 Claims. (Cl. 251—60)

The present invention relates generally to valves and means for operating them, and is more especially concerned with devices of this type in which a pressure responsive diaphragm is provided to control opening and closing of the valves.

In valves of this type, the valve disc, movement of which controls fluid flow, has been connected to the operating diaphragm in such a way that the movement of the valve disc is equal to the travel of the diaphragm at its central portion. Since the diaphragm ordinarily makes a full excursion, the valve disc is moved thereby from a closed position to a fully open position. Valves of this type are not adaptable to being moved to only a partially open position or one in which the flow in response to movement of the diaphragm is less than the maximum possible through the valve itself.

Hence it becomes a general object of my invention to provide valve mechanism of the type described in which the movement of the valve disc may be adjusted to achieve a partially open position without reducing the maximum travel of the diaphragm itself.

It is a further object of my invention to provide valve operating mechanism of the type described wherein the diaphragm is lighter and therefore more sensitive to pressure variation than is the case with known constructions of the valve operating device.

A further object of my invention is to provide a design for the housing enclosing the diaphragm which makes it possible to join the halves of the housing together by a screw thread and at the same time be sure that the diaphragm makes a fluid tight seal around its entire periphery with the halves of the housing.

These objects of my invention are achieved in a fluid pressure actuated operating means for a valve having a fixed seat and a movable valve disc, by providing a housing and a diaphragm inside the housing and engaged around its periphery by the housing to divide the interior space into two compartments. A valve stem is attached to the valve disc and is movable therewith toward and away from the fixed seat in order to regulate fluid flow through the opening at the seat, this valve stem being engaged by the diaphragm to be moved thereby. The diaphragm has a reinforced central portion which is relatively rigid and is able to withstand high fluid pressure, while the surrounding annular portion of the diaphragm is relatively flexible and at the extreme ranges of diaphragm movement is able to bear against a portion of the housing to be fully supported thereby. The diaphragm engages the stem with a sliding connection, the stem having a shoulder or the like which is engaged by the diaphragm in order to move the diaphragm in the direction of the valve seat. A sliding connection permits the diaphragm to make a full excursion in a direction to open the valve without necessarily carrying the valve and stem with it for the full distance. To take full advantage of this situation there may also be provided adjustable stop means which engages the stem to limit the travel of the valve disc away from the seat to less than the travel of the diaphragm.

How these objects and advantages of my invention, as well as others not specifically referred to herein are attained, will become more readily apparent to those skilled in the art from the following description and the appended drawing, in which:

FIG. 1 is a longitudinal median section through a valve and diaphragm type operating device therefor, the valve being of the normally open type and shown in the closed position.

FIG. 2 is a half section similar to FIG. 1 showing the valve in a partially open position with the diaphragm at the opposite extreme position from that illustrated in FIG. 1.

FIG. 3 is a longitudinal median section through a variational embodiment of my invention applied to a normally closed valve.

FIG. 4 is a fragmentary median section through a diaphragm housing illustrating a variational construction for obtaining a tight seal between the housing and the flexible diaphragm.

Referring now to the drawing, the valve construction shown in FIG. 1 comprises two main sections, a valve body 1, and a housing 2 for the diaphragm actuator for the valve.

Valve body 1 may be of any conventional design and is provided with an inlet opening 3 and an outlet opening 4 at opposite sides of the body. Interposed between the inlet and outlet openings 3 and 4 respectively is a web 1a provided with an opening 5 which is surrounded by a valve seat 6. The valve body is not necessarily limited to the particular type herein illustrated, because as will be more apparent from later description, it is contemplated that the diaphragm actuator may be used with various types of valves or made separately for attachment to various valve bodies.

The exterior wall of valve body 1 has a projecting annular flange 7 which is internally threaded and provides a bore 8 having its axis in a plane perpendicular to the plane of valve seat 6. Bore 8 is adapted to receive a similarly threaded portion of housing 2 in order to mount the latter upon body 1. This construction with a threaded connection between the two parts is preferred for various reasons but it is within the scope of my invention to make the valve body and the housing for the diaphragm as integral members, if desired.

Housing 2 is here shown as made in two halves 10 and 11 which are connected together by a screw thread connection at 12, although any suitable type of connection between the two halves of the housing may be employed. Housing 2 defines an interior space which is divided into upper and lower compartments 13a and 13b respectively by means of diaphragm 14 which is gripped around its periphery between opposing surfaces on the two halves 10 and 11 on housing 2. Although not necessarily limited to this type of diaphragm it is preferable that the diaphragm be of the beaded type, that is the outer rim 14a is made thicker and resembles an O-ring, as is well known in the art. Rim 14a is received in an annular groove 15 which is machined into lower body section 11. When the upper body section 10 is screwed down against the peripheral portion of the diaphragm, the thickened rim 14a fits snugly in groove 15 to provide a fluid tight seal at this point. In order to facilitate turning the upper body section, it is preferably provided with a central hub 16 of polygonal cross-section designed to received a wrench.

The central portion of diaphragm 14 is reinforced by the addition to it on each side of a plate 18, the diaphragm being clamped between the two plates to effect a fluid tight seal. Plates 18 are held between the head of collar 20 and ring nut 21 which is screwed onto the threaded shank of collar 20. From references to FIGS. 1 and 2 it will be seen that each of body members 10 and 11 are provided with an internal seat 22 located to be engaged by one of plates 18 at the upper or lower extreme of the travel of the diaphragm.

Housing 2 is made in a well known manner in which the two halves 10 and 11 are provided with flat radial surfaces near their peripheries which are designed to provide opposed shoulders that grip between them the peripheral portion of diaphragm 14, as already described. Inwardly of this shoulder on each half of the housing, the housing has a section of frusto-conical shape so that inwardly of these shoulders the housing walls diverge. The dimensions of the diaphragm are such that at both extremes of movement when plates 18 are received in one of the seats 22, the annular flexible portion of the diaphragm surrounding the central reinforcing section 18 lies against the inner surface of the housing. By this construction, the flexible portion of the diaphragm is always fully supported on one side against fluid pressure on the other when at the extreme positions, except possibly for a very short transition section bridging the gap between the support furnished by the housing wall and the support furnished by plates 18. This construction is preferred because the support of the diaphragm on one side allows the use of relatively high fluid pressures within the housing without any danger of rupturing the diaphragm. Conversely, the diaphragm may be made thinner and therefore more flexible and more sensitive in its response to fluid differential pressures than would be possible if the diaphragm were of prior designs.

Valve stem 24 is connected at its lower end to valve disc 25 which engages annular valve seat 6 in order to close opening 5 to the flow of fluid therethrough. Valve stem 24 is adapted to longitudinal movement and has its axis perpendicular to the plane of valve seat 6. The lower end of housing 2 is provided with a web or a spider 26 having therein a central opening through which the valve stem 24 passes and is free to move longitudinally. This lower portion of the stem may be non-circular in order to hold the valve against rotation. The upper portion of valve stem 24 is smaller in diameter than the lower portion to provide a shoulder 19. Above shoulder 19 the valve stem is circular in cross section and passes through a bore in collar 20. A fluid tight seal between the collar and the valve stem is attained by the provision of sealing member 27, which is preferably an O-ring or a similar member.

Valve stem 24 extends upwardly into hub 16 of housing 2 where it is received within a guide bore in the adjustable stop member 28. Stop 28 is screw threaded into a bore within hub 16 of the housing. Stop 28 is preferably provided with a hand wheel 29 by which it may be grasped in order to turn the member manually. A suitable sealing member 30 is preferably provided to prevent leakage of liquid around the shank of the stop member.

Means are provided for introducing fluid into the housing to fill compartment 13a. Such means includes tubing 32. The valve illustrated in FIG. 1 is designed to be a normally open valve and therefore operating fluid from an outside source is introduced into the space above diaphragm 18 through tubing 32 which is connected to upper housing section 10 by a fitting of any suitable design. The space 13b beneath diaphragm 14 is placed in communication with the outlet side of the valve body 1 by means of opening 33 through web 26. This permits fluid at the underside of the diaphragm to exhaust through this opening and leave the valve body through outlet 4.

Having described the preferred embodiment of my invention, I shall now describe its operation. Assume that fluid under pressure is introduced into the chamber 13a above diaphragm 14 through tubing 32. When the fluid pressure is sufficient, the diaphragm is forced downwardly to the extreme position shown in FIG. 1. The fluid pressure exerted on the underside of the diaphragm when valve 25 is closed is normally very low, if not zero, because of the connection through opening 33 of the space under the diaphragm to the outlet 4 of valve body 1. Downward travel of the diaphragm ceases when the rim of lower plate 18 enters the recess 22 in the face of lower housing section 11. Diaphragm collar 20 seats against shoulder 19 on valve stem 24 carrying the valve stem downwardly with the diaphragm to bring disc 25 into engagement with valve seat 6, thus closing the opening 5 to the passage of fluid therethrough. The pressure of fluid on the underside of valve disc 25 exposed over the area of opening 5 produces the only force tending to move stem 24 upwardly and to open the valve disc. This force is opposed by the fluid pressure above the diaphragm exerted over the full area of upper disc 18. Since this area is larger than the area of disc 25 exposed at opening 5 to inlet pressure, the valve remains closed as long as the pressure on top of the diaphragm is maintained.

Because of these area relationships, if the operating fluid admitted through tubing 32 comes from the same source as the fluid entering through valve inlet 3, and it is therefore at the same pressure, the operating fluid is at sufficient pressure to keep the valve closed. It is also sufficient to close the valve, as just described even though it may seem at first as if the unit pressures and the effective areas above and below the diaphragm are respectively equal. However, there is some loss in pressure due to turbulence of the fluid as it passes through the restricted opening 5 and the irregular passages of the valve proper and the conduits leading to it. As a consequence there is sufficient pressure differential on the two sides of the diaphragm during its downward travel to close valve 25 against seat 6.

In order to open the valve and permit flow of fluid between inlet 3 and outlet 4, the unit pressure on the fluid in the space above the diaphragm is reduced. This is normally accomplished by another valve that disconnects tubing 32 from the source of fluid under pressure and vents the upper compartment 13a to the atmosphere. Valves for this purpose are well known in the art and need no description here since they do not constitute any part of the present invention. With the reduction of fluid pressure above the diaphragm to atmospheric, or approximately thereto, the upward force on valve disc 25 and stem 24 exerted by the pressure of fluid entering valve body 1 through inlet 3 is sufficient to lift the valve disc from seat 6 and permit fluid to flow past the valve disc to outlet 4. Once valve disc 25 has lifted, fluid under pressure within the valve body can pass upwardly through opening 33 to exert a force on the underside of diaphragm 14 that maintains the diaphragm in the raised position. This latter force causes the diaphragm to make a full excursion between the lower position of FIG. 1 and the raised position of FIG. 2 independently of whether or not stem 24 travels the same distance.

As has already been mentioned, the connection between the stem and the diaphragm is of a slidable nature and permits the diaphragm to overtravel the stem as they move upwardly or in a direction to open valve 25. As a result the diaphragm always travels the full distance to bring upper plate 18 into contact with the upper seat 22 in which position of the diaphragm the flexible portion around the reinforced central part is fully supported by engagement with the inner face of housing section 10.

The limit of upward travel of stem 24, that is travel in a direction away from seat 6, is established by the position of adjustable stop 28. The stop may be raised as shown in FIG. 1, permitting the stem to move upwardly for the full distance permitted by movement of the diaphragm, as shown in broken lines in FIG. 1. It is desirable, however, at times to restrict the flow of fluid through opening 5 in the valve; and this is accomplished by permitting valve disc 25 to open only partially. Only partial opening of valve 25 is accomplished by lowering adjustable stop 28 to some such position as is shown in FIG. 2 in which the upper end of stem 24 engages the stop to limit the travel of disc 25 to the amount desired. As a result, a smaller opening is formed between seat 6 and the valve disc which restricts the flow of liquid through opening 5. Even though stem 24 engages stop 28 to limit the upward travel of the stem, collar 20 is able to slide upwardly on stem 24, permitting diaphragm 14 to make a full excursion between the upper and lower positions, as previously described.

A feature of the present invention is that the actuator assembly in housing 2 may be used as a conversion unit to change manual valves to automatic. For example, assume the valve body is part of a valve installed in a lawn sprinkler system. By removing the original valve stem, disc and cap, the housing 2 may be attached as shown to the valve body. Disc 25 replaces the original valve disc. Line 32 is connected through a suitable remote-control valve (not shown) with the source of water supplied to inlet 3. This water under pressure is used as operating fluid.

FIG. 3 illustrates the application of my invention to a valve of the normally closed type. This type of valve is one that closes without the introduction of pressure fluid from an external source into the compartment above the diaphragm. In this vase the fluid introduced under pressure is derived from an internal source, that is from the inlet side of fluid passage 5 in the valve body.

The construction of the normally closed valve of FIG. 3 is the same as that of the normally open valve already described, except for certain changes that will now be explained. In the first place, a connection of tubing 32 is transferred from the compartment 13a above the diaphragm to the compartment 13b below the diaphragm since it is desired that the control fluid introduced through line 32 exert a force on diaphragm 14 in a direction to open valve disc 25. In order that fluid under pressure may be confined in the compartment within housing 2 below the diaphragm, this compartment is sealed off from the interior of valve body 1. This is accomplished by replacing web 26 at the bottom of housing 2 with plug 34 which is preferably screw threaded in order to facilitate assembly of the parts. Plug 34 is provided with a central bore through which slides the stem 24a which is connected to valve disc 25, as previously explained. Since a fluid tight seal between the outlet side of the valve body 1 and lower compartment 13b is required in this type of valve, the enlarged portion of the stem is circular in cross-section and plug 34 is provided with O-ring 35 or other means of obtaining a fluid tight seal around the valve stem.

In order to admit fluid under pressure into the space above diaphragm 14, stem 24 is provided with a longitudinally extending bore 38 which extends for the full length of the stem. One side of this longitudinal bore is cut away to provide slot 37 that communicates with the compartment above the diaphragm at any position of the valve stem, thus placing compartment 13a in continuous communication with the inlet to valve body 1. Opening 25a is made in valve disc 25 so that pressure from fluid entering valve body 1 through inlet 3 can be transmitted through opening 25a, bore 38, and slot 37 to the space above diaphragm 14 and exert a force on the upper side of the diaphragm. Passages 38, 37 also provide a means for exhausting the fluid from the space above the diaphragm when the diaphragm moves upwardly as the valve 5 opens.

When no fluid pressure is applied through tubing 32 to the lower chamber 13b at the underside of the diaphragm, the pressure above the diaphragm from the inlet side of the valve is sufficient to force the diaphragm into engagement with the shoulder on the valve stem and bring the valve down into engagement with seat 6, thus closing opening 5 to flow of fluid therethrough. To accomplish this, the effective area over which the fluid exerts pressure on the upper side of the diaphragm is made larger than the area exposed to pressure at opening 5.

The valve is opened by introducing operating fluid through tubing 32 to exert pressure on the underside of the diaphragm in a direction to permit valve disc 25a to move to the open position.

This fluid at the underside of the diaphragm exerts an upward force over the effective area, which is approximately equal to the area of the reinforced section of the diaphragm. This force is in the same direction and in addition to the upward force exerted against the valve disc over the area exposed at opening 5 to fluid entering body 1. The total of these two forces is great enough to open valve 5 because the total area subjected to pressure is greater than the effective area subjected to pressure above the diaphragm. Thus fluid applied through tubing 32 at the same unit pressure as the fluid entering the valve body through inlet 3 is able to move the valve to an open position.

FIG. 4 illustrates an alternate construction which is especially designed to eliminate the need for accurate machining of the threads at 12 joining together the two sections 10a and 11a of housing 2. Should the two sections 10a and 11a not be accurately machined, it is possible for the upper housing section 10a to be screwed down as tightly as possible and yet not make a fluid-tight seal around the entire periphery of the diaphragm. This is especially true with diaphragms of large diameter when a relatively high torque is necessary to screw down the upper housing section 10a. In this form of the invention the upper half of the housing 10a is provided with a liner 40 which conforms in shape generally to the interior surface of housing section 10a, and includes a flat peripheral flange 40a which is interposed between the two opposed shoulders of the housing sections. Thus the flat flange 40a of the liner rests upon and engages one side of the peripheral portion of the diaphragm. Around the periphery of housing section 10a there is a plurality of set screws 42 which can be independently turned down. The inner end of each of these screws bears against the upper surface of flange 40a. The liner is sufficiently deformable that when screws 42 are turned down they press the flange 40a into sealing engagement with the diaphragm, even though the shoulder portions on the housing sections are not sufficiently close together to effect this seal themselves.

The inner or upper end of liner 40 is held in fluid tight engagement with the inner surface of housing section 10a by means of screws 43 and seal 44.

In this form of the invention the liner 40 becomes in effect a part of the upper section 10a of the housing enclosing the diaphragm and at the extreme upper position the diaphragm engages the liner in exactly the same way as it engages the housing section in the forms of the invention previously described. Thus the liner supports the flexible annular section of the diaphgram surrounding the reinforced central portion.

From the foregoing description it will be seen that various changes in the design and arrangement of parts will occur to persons skilled in the art without departing from the spirit and scope of my invention. Accordingly all such changes are considered to fall within the scope of the appended claims.

I claim:

1. In a fluid-pressure actuated valve having a fixed valve seat and a movable valve disc cooperating therewith, the combination comprising:

a housing enclosing an interior space, said housing comprising two halves connected by meshing screw threads and providing two engaging annular shoulders adjoining frusto-conical portions of the housing halves;

a diaphragm inside the housing and held around its periphery between the two engaging shoulders to divide the housing interior into two separate compartments, said diaphragm having a rigid central portion surrounded by an annular flexible portion;

a valve stem connected to the valve disc and engageable by the diaphragm to be moved thereby toward the fixed seat;

a liner conforming to the inner surface of one-half of the housing and having a flat peripheral flange interposed between one of the annular shoulders of the housing and the peripheral portion of the diaphragm;

and a plurality of screws in said one-half of the housing bearing at one end against said flange of the liner to force said flange against one face of the diaphragm to effect a fluid tight seal with the diaphragm.

2. In a fluid-pressure actuated valve having a fixed seat and a movable valve disc cooperating therewith to control fluid flow through the valve, the combination comprising:

a housing enclosing an interior space;

a diaphragm inside and engaged around its periphery by said housing to divide said interior space into two compartments, said diaphragm having a reinforced central portion surrounded by a flexible portion;

a valve stem attached to the valve disc and extending through the reinforced portion of the diaphragm from one side thereof to the other, said stem slidably engaging the reinforced portion of the diaphragm and having a shoulder engageable by the diaphragm by movement in a direction to move the stem and valve disc toward the valve seat while allowing the diaphragm to move in the opposite direction for the full range of its movement independently of the valve stem.

3. The combination as claimed in claim 2 that also includes adjustable stop means engaging the stem to limit the travel of the stem and valve disc away from the seat, said stop means comprising a member extending outside the housing for operation thereof and movable to change the point of its engagement with the stem within the maximum range of travel of the valve disc and stem.

4. The combination as claimed in claim 2 that also includes means for introducing operating fluid into each of the compartments at opposite sides of the diaphragm, and sealing means carried by the diaphragm and frictionally engaging the stem to seal the sliding connection against passage of fluid from one compartment to the other.

5. The combination as claimed in claim 2 that includes passage means for introducing fluid into the compartment at one side of the diaphragm from a source internal of the valve;

means for introducing fluid into the compartment at the other side of the diaphragm from a source external of the valve;

and sealing means at the sliding connection between the diaphragm and stem to prevent leakage of fluid around the stem from one compartment to the other.

6. In a fluid-pressure actuated valve having a fixed seat and a movable valve disc cooperating therewith to control fluid flow through the valve, the combination comprising:

a housing enclosing an interior space;

a diaphragm inside said housing and engaged around its periphery by the housing to divide said interior space into two compartments, said diaphragm having a reinforced central portion;

a valve stem attached to the valve disc at one side of the diaphragm and extending through the diaphragm from said one side to the other, said stem slidably engaging the central portion of the diaphragm and having a shoulder engageable by the diaphragm to move the stem and valve disc towards the valve seat while allowing the diaphragm to move in the opposite direction for the full range of its movement independently of the valve stem;

and a combined guide and stop member mounted on the housing at said other side of the diaphragm away from the valve disc and extending outside the housing for manual adjustment thereof, said combined guide and stop member slidably receiving one end of the valve stem and being adjustable toward and away from the valve disc to limit travel of the valve and stem independently of the diaphragm.

References Cited in the file of this patent

UNITED STATES PATENTS

| | | |
|---|---|---|
| 892,788 | Wilkins | July 7, 1908 |
| 1,875,672 | Stewart | Sept. 7, 1932 |
| 2,227,055 | Bischoff | Dec. 31, 1940 |
| 2,573,680 | Arnold | Nov. 6, 1951 |
| 2,583,502 | Wiggins | Jan. 22, 1952 |
| 2,602,467 | Griswold | July 8, 1952 |
| 2,657,701 | Hupp | Nov. 3, 1953 |
| 2,709,451 | La Bour | May 31, 1955 |